Dec. 15, 1964     L. A. SCHOTT     3,161,154
MEANS FOR FILLING A FRANKFURTER WITH A STRIP OF CHEESE
Filed Aug. 6, 1962
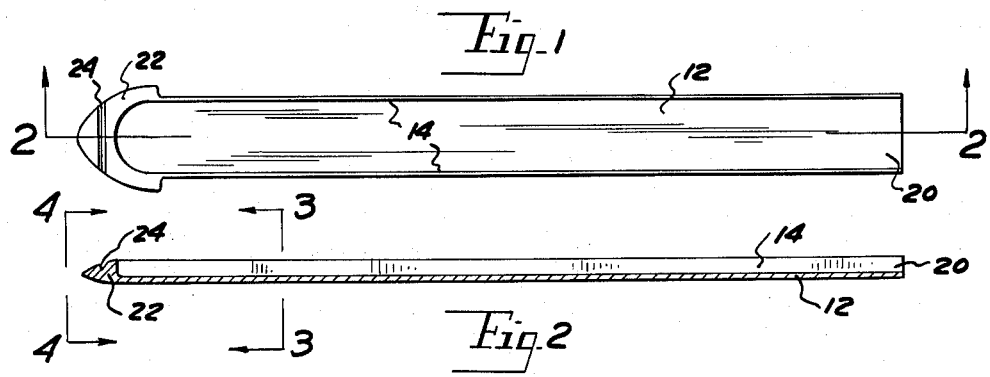
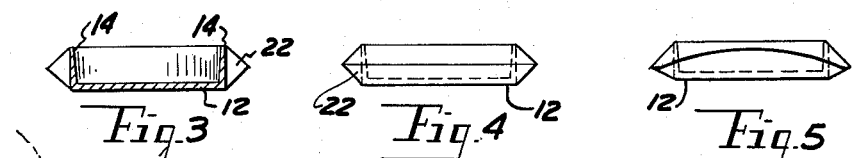
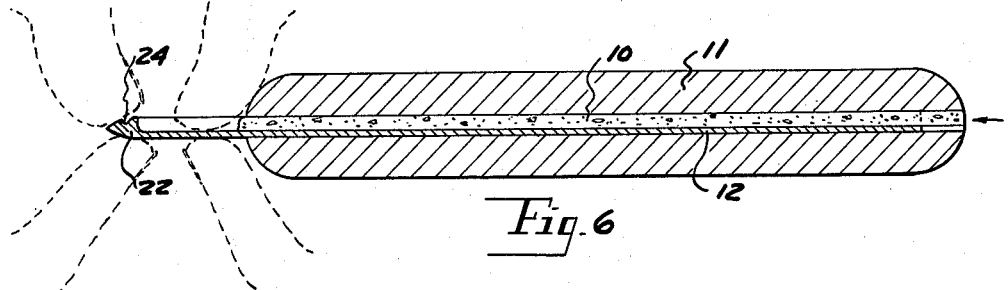
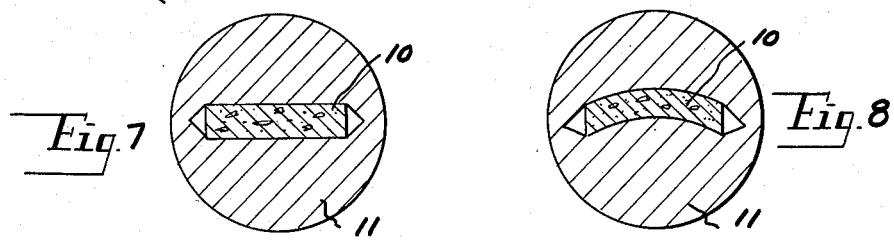
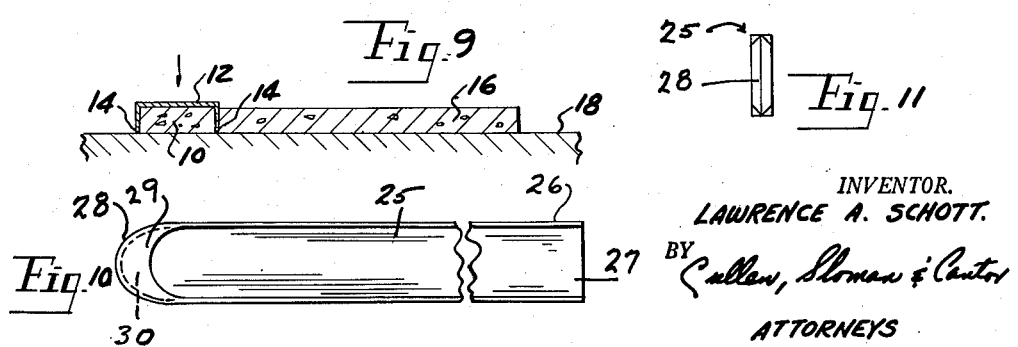
INVENTOR.
LAWRENCE A. SCHOTT.
BY Cullen, Sloman & Cantor
ATTORNEYS

United States Patent Office 3,161,154
Patented Dec. 15, 1964

3,161,154
MEANS FOR FILLING A FRANKFURTER WITH
A STRIP OF CHEESE
Lawrence A. Schott, 16261 Northlawn Ave., Detroit,
Mich., assignor of one-half to Charles A. Raleigh,
Detroit, Mich.
Filed Aug. 6, 1962, Ser. No. 214,940
2 Claims. (Cl. 107—1)

This application relates to a means and a method for inserting a strip of cheese in a frankfurter and thus filling the frankfurter with cheese.

A particular object of the present invention is to provide an inexpensive conveniently used tool and method for filling a frankfurter with a strip of cheese.

Further objects of the present invention will be best understood upon reference to the appended drawing and to the specification which follows:

In this drawing:

FIG. 1 is a top plan view of the tool, full size.

FIG. 2 is a longitudinal section as if on line 2—2 of FIG. 1.

FIG. 3 is a transverse section as if on line 3—3 of FIG. 2.

FIG. 4 is a front end view as if on line 4—4 of FIG. 2.

FIG. 5 is a view similar to FIG. 4, but showing a modified form of tool.

FIG. 6 shows in longitudinal section, a frankfurter with a cheese strip filled tool therein and being manipulated for removing the tool from the frankfurter after the tool has served its purpose.

FIG. 7 is a transverse section of a cheese filled frankfurter.

FIG. 8 is a view similar to FIG. 7, but showing the use of the modification shown in FIG. 5.

FIG. 9 diagrammatically illustrates the use of the tool in severing a strip of cheese from a slice of cheese.

FIG. 10 is a fragmentary plan view of a modified tool.

FIG. 11 is a left end view thereof.

Referring to the drawing, it will be observed that the tool used for inserting a strip 10 of cheese in a frankfurter 11 comprises a long channel shaped tool 12 made of an inexpensive but suitable material such as plastic, fibre, metal, unbreakable glass, or the like. The tool 12 is of the width and thickness of the desired strip of cheese, and it is somewhat longer than the desired strip.

The sides of the channel are upright and the edges 14 of the channel are rather sharp to enable a strip 10 to be severed from a slice 16 of cheese merely by pressing the tool down upon a slice at that time resting on a support 18 such as a table top. The severed slice will remain in the tool.

The tool has an open rear end 20 and a closed pointed or wedge-shaped forward end 22, which may be enlarged, FIG. 1 for enabling the strip filled tool to be thrust longitudinally through a frankfurter in the direction of the arrow shown at the right of FIG. 6.

The forward end 22 may be enlarged relative to the channel so that the forward end of the tool wedges its way and forms a passage through the frankfurter wider than the channel as shown best in FIG. 7, and the forward end is transversely grooved as shown at 24 to provide a finger grip illustrated in FIG. 6.

The method for filling the frankfurter with a strip of cheese and the method for using the tool hereof comprises first severing a strip 10 from a slice 16 of cheese by pushing down as shown by the arrow in FIG. 9 with the sharp edges 14 of the tool serving as cutting edges. The strip of cheese, now severed from the slice, fills and remains in the tool and thus loads the tool so that the latter is ready for use for inserting the strip in the frankfurter. This is done first by puncturing the rear end of the frankfurter 11, shown to the right in FIG. 6, and then thrusting the tool longitudinally through the frankfurter by pushing on the rear end of the tool with the forward pointed end wedging and forcing its way through the frankfurter and thus loading the frankfurter with a strip of cheese.

When the operation is completed, the parts will be more or less as shown in FIG. 6 with the forward end of the tool projecting beyond the forward end of the frankfurter and with most of the tool, and all of the cheese or other element strip therein being within the frankfurter. At this point, using the fingers of both hands more or less as shown in FIG. 6, the tool is stripped from the filled frankfurter by being pulled at its forward end using the finger grip 24 for this purpose. The fingers also retain strip 10 within the frankfurter during stripping.

While the tool shown in FIGS. 1–4, 6, 7 and 9, is shown as flat bottomed, it may also be arcuately bottomed as shown in FIG. 5 to enable an arcuate groove to be cut into the frankfurter more or less as shown in FIG. 8.

In FIGS. 10 and 11, the tool 25 is similar to the tool of FIG. 1, being of channel form with upright side edges 26 and open end 27. The curved or tapered head 28 is of the same width as the body and has a cover portion 29 undercut at 30.

Whereas an insertion of a strip of cheese is described with respect to the illustrative embodiment of the invention, it is contemplated that other food products or condiments could be inserted into a frankfurter in accordance with the present method and apparatus.

Now having described the tool hereof and its method of use, reference should be had to the claims which follow for determination of the scope of the invention.

I now claim:

1. For inserting a strip of cheese in a frankfurter, a long channel shaped tool of the length and thickness of the desired strip, with the channel flanges being sharp edged to enable the tool to sever a strip of cheese from a slice of cheese; said tool having an open rear end and a closed pointed forward end formed for enabling the strip filled tool to be thrust longitudinally through a frankfurter, said forward end being enlarged relative to the channel so that the forward end of the tool forms a passage through the frankfurter wider than the channel.

2. An insertion tool for severing a rectangular cross-section strip from a slice of a food product and loading such rectangular cross-section strip into the insertion tool for insertion of the strip endwise into a frankfurter; said tool being of the shape of a channel of the length and depth of the desired strip; said channel being of square U-form with the sides at sharp right angles to the bottom; said sides being sharp edged to enable the tool to sever the strip from the slice merely by laying the tool, open side down, on a table supported slice and pressing it down onto the slice; said tool having a closed pointed forward end for enabling the strip filled tool to be thrust longitudinally through a frankfurter.

References Cited by the Examiner

UNITED STATES PATENTS

| 754,501 | 3/04 | Reynolds | 17—42.1 |
|---|---|---|---|
| 1,191,831 | 7/16 | Royer et al. | 107—1 |
| 2,548,165 | 4/51 | Koch | 30—124 |
| 2,751,864 | 6/56 | Parker | 107—1 |
| 2,782,707 | 2/57 | Spies | 107—1 X |
| 2,937,092 | 5/60 | Zitin | 99—107 |
| 2,937,095 | 5/60 | Zitin | 99—174 |

ROBERT E. PULFREY, *Primary Examiner.*

H. LORD, CHARLES A. WILLMUTH, *Examiners.*